United States Patent [19]

Valentin et al.

[11] Patent Number: 4,829,826
[45] Date of Patent: May 16, 1989

[54] DIFFERENTIAL-PRESSURE TRANSDUCER

[75] Inventors: Jean-Pascal Valentin, Pouilley-les-Vignes; Pierre Maître, Besancon, both of France

[73] Assignee: Fischer & Porter Company, Warminster, Pa.

[21] Appl. No.: 191,134

[22] Filed: May 6, 1988

[30] Foreign Application Priority Data

May 7, 1987 [FR] France ............................. 87 06751

[51] Int. Cl.$^4$ ............................. G01L 7/08; G01L 9/12; G01L 13/02
[52] U.S. Cl. .......................................... 73/718; 361/283
[58] Field of Search ..................... 73/718, 724, 708; 361/283

[56] References Cited

U.S. PATENT DOCUMENTS 3,277,720 10/1966 Roth ...................................... 73/718
4,612,812 9/1986 Broden ................................. 73/718

Primary Examiner—Donald O. Woodiel
Attorney, Agent, or Firm—Michael Ebert

[57] ABSTRACT

A differential pressure transducer of the capacitive type responsive to fluid pressure. The transducer includes a cylindrical body having insulating sections at either end provided with a planar end face and a concave cavity surrounded by an annular rim. The cavities communicate with each other through an internal duct in the body and are filled with a dielectric fluid. Covering each cavity and sealed to the surrounding rim is a diaphragm provided with a movable electrode which cooperates with a fixed electrode on the cavity surface to form a capacitor therewith whose value varies as a function of diaphragm deflection in response to an applied pressure. The contour of each cavity is defined by an inner concave portion whose center is aligned with the longitudinal axis of the body and whose periphery merges with an inflection zone, and an outer portion which curves from the inflection zone toward the rim to merge tangentially therewith to avoid a sharp angle at the inner edge of the rim, the inflection zone being about half the distance from the center to the rim.

10 Claims, 1 Drawing Sheet

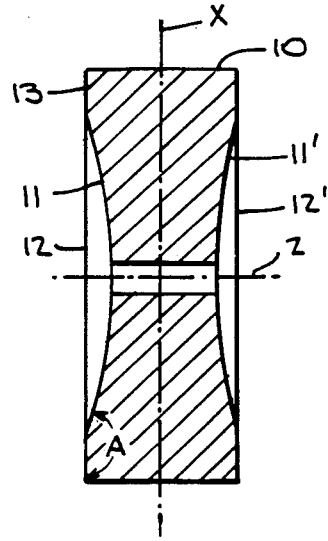
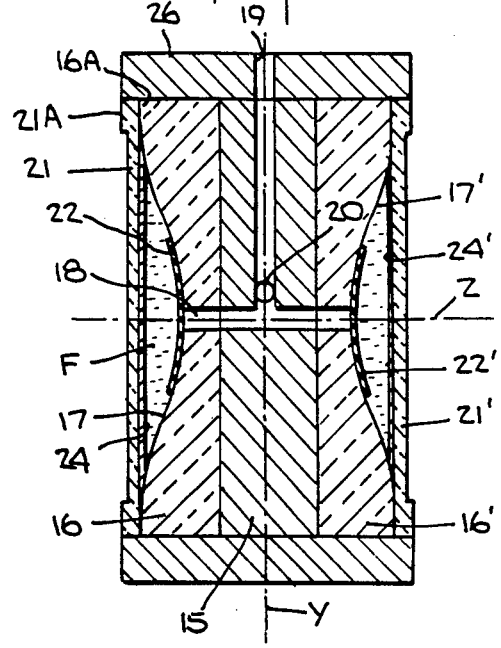
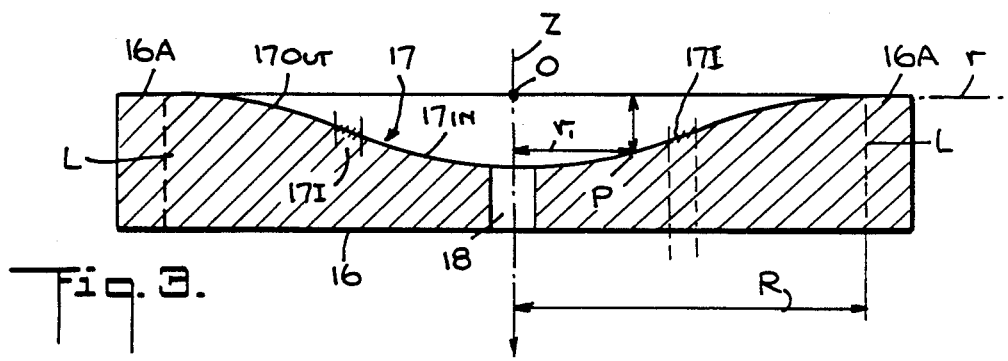
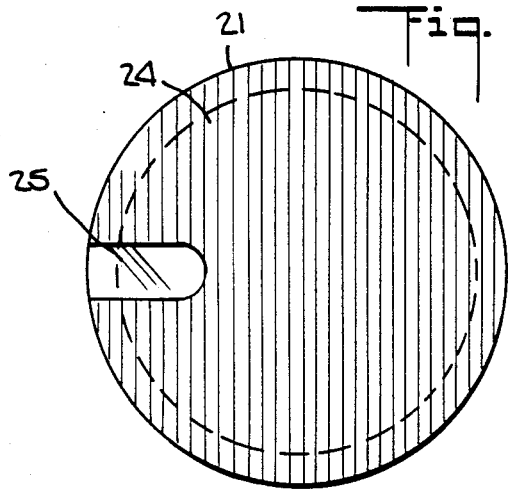
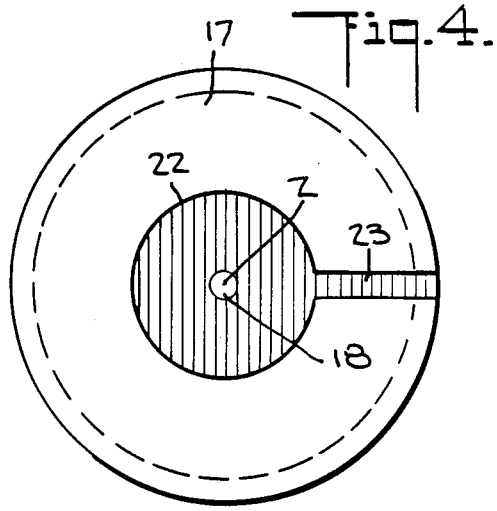

DIFFERENTIAL-PRESSURE TRANSDUCER

BACKGROUND OF INVENTION

1. Field of Invention:

This invention relates generally to differential pressure transducers of the capacitive type, and more particularly to a transducer having a pair of diaphragms, one being responsive to an applied high pressure and the other to an applied low pressure, each diaphragm functioning as the movable electrode of a variable capacitor.

2. Status of Prior Art:

It is known in industrial process control systems to use differential-pressure (D-P) transducers for flow measurement. Thus, to determine the flow rate of a process fluid (liquid or gas) in a pipeline, an aperture plate is interposed therein and a differential pressure transducer acts to sense the degree of pressure drop developed between opposite sides of the aperture plate. The pressure drop is proportional to the square of the flow rate.

One simple form of differential-pressure transducer of the capacitive type consists of a case divided by an electrically conductive diaphragm into a pair of cavities or chambers, each having a stationary electrode mounted therein to define with the conductive diaphragm a capacitor whose value varies as the diaphragm is deflected. Low fluid pressure from the aperture plate is applied to one diaphragm and high pressure to the other.

In this known form of D-P transducer, the conductive diaphragm and the stationary electrodes on either side thereof form a three-terminal capacitive potentiometer in which the diaphragm is the variable element. By arranging this element in a bridge circuit excited by a voltage of, say, 10 kHz, the capacitance changes caused by diaphragm deflection unbalance the bridge to produce a 10 kHz output whose amplitude is directly proportional to pressure.

A D-P transducer arrangement using metal diaphragms is disclosed in U.S. Pat. No. 4,398,194 to Johnson in which the transducer is formed by a pair of opposing sensing chambers formed in an insulating body bounded by diaphragms which in conjunction with conductive layers coated on an insulating body form variable capacitors. The chambers are filled with an incompressible dielectric fluid and are interconnected by a duct going through the body. Also of prior art background interest are the U.S. Pat. Nos. to Paquin et al., 4,301,491; Bell et al., 4,458,537; Rickner, 2,753,515; Wolfe, 2,999,385; Vasuhara, 4,169,389; Hirtreiter, 2,808,545; Frick, 3,618,390; Akley, 3,691,842, and Yashuhara, 4,072,057.

Of particular interest is the Orlowski et al. U.S. Pat. No. 4,531,415, which discloses a D-P transducer in which the diaphragms are made of ceramic or other insulating corrosion-resistant material having on their inner surfaces film electrodes which face the end surfaces of an insulating body on which stationary electrodes are formed. Hence, the outer surfaces of the diaphragms can be exposed to either corrosive or non-corrosive process fluids. In Orlowski et al, the insulating body together with the diaphragms define a pair of cavities which are filled with silicone oil or other dielectric fluid. In order to prevent damage to the diaphragms as a result of overdrive caused by excessively large input pressure differences, deflection of each diaphragm is limited by raised supports on the surfaces of the insulating body facing the diaphragm. In some of the prior art D-P cells, each cavity formed in the body of the transducer has a shape adapted to receive the diaphragm covering the cavity when it is inwardly deflected. The cavity for this purpose is usually in the form of a spherical cup. One disadvantage of this known arrangement is that the resultant variation in capacitance as the diaphragm is deflected is not a linear function of the variation in differential pressure.

Hence, it becomes necessary, as in the U.S. Pat. No. 4,193,063 (Hitt) to associate the cell with a complex electronic circuit to render the signal produced by the cell a linear function of differential pressure. Another drawback of such cells is that because of the spherical shape of the cavities, the diaphragm is subjected to high stress near the periphery of the cavity which defines a more or less sharp edge with the diaphragm.

SUMMARY OF INVENTION

In view of the foregoing, the main object of this invention is to provide a D-P transducer of the capacitive type whose diaphragms are capable of sustaining, without appreciable stress, repeated high pressure variations.

Also an object of the invention is to provide a D-P transducer whose capacitance varies as a linear function of differential pressure, thereby obviating the need for external linearization circuits.

Yet another object of the invention is to provide a transducer of the above type whose diaphragms are of a nonmetallic material that is non-reactive to corrosive fluids, so that the transducer can be employed in corrosive as well as non-corrosive environments.

A significant advantage of the invention is that because the diaphragms are not subjected to appreciable stresses, the effective life of the D-P cell is greatly prolonged. This invention also makes it possible to use diaphragms of greater stiffness than metallic diaphragms, such as those made of glass or ceramic material which are non-reactive with the fluid whose pressure is being measured.

Briefly stated, these objects are attained in a differential pressure transducer of the capacitive type responsive to fluid pressure. The transducer includes a cylindrical body having insulating sections at either end provided with a planar end face and a concave cavity surrounded by an annular rim. The cavities communicate with each other through an internal duct in the body and are filled with a dielectric fluid. Covering each cavity and sealed to the surrounding rim is a diaphragm provided with a movable electrode which cooperates with a fixed electrode on the cavity surface to form a capacitor therewith whose value varies as a function of diaphragm deflection in response to an applied pressure. The contour of each cavity is defined by an inner concave portion whose center is aligned with the longitudinal axis of the body and whose periphery merges with an inflection zone, and an outer portion which curves from said inflection zone toward the rim to merge tangentially therewith to avoid a sharp angle at the inner edge of the rim, the inflection zone being about half the distance from the center to the rim.

BRIEF DESCRIPTION OF DRAWINGS

For a better understanding of the invention as well as other objects and further features thereof, reference is made to the following detailed description to be read in conjunction with the accompanying drawings, wherein:

FIG. 1 schematically illustrates a prior art D-P transducer;

FIG. 2 is a sectional view of a D-P transducer in accordance with the invention;

FIG. 3 is a cross section of one cell cavity in the transducer;

FIG. 4 shows in plan view the electrode formed on the surface of the cavity; and FIG. 5 shows in plan view the electrode formed on the diaphragm surface.

DESCRIPTION OF INVENTION

Prior Art D-P Transducer

Referring now to FIG. 1, there is shown a typical double-cell D-P transducer which includes a cylindrical insulating body 10 having planar end faces. Formed in one end face of body 10 is a concave cavity 11 covered by a diaphragm 12 whose peripheral margin is bonded to an annular rim 13 surrounding the cavity. Likewise formed in the other end face of body 10 is a concave cavity 11' covered by a diaphragm 12' bonded to an annular rim 13'. The cavities are interconnected by a duct 14 running through the center of body 10, the cavities being filled with a dielectric fluid.

Cavities 11 and 11' are symmetrically disposed with respect to a longitudinal axis Z passing through the center of the cavities and a transverse axis Y which intersects axis Z and passes through the central plane of body 10. Each cell includes a stationary electrode formed on the surface of its cavity and a movable electrode formed on the surface of its diaphragm to create a pressure-responsive variable capacitor (the electrodes are not shown in FIG. 1).

Cavities 11 and 11' in a typical prior art transducer have a substantially semi-spherical shape. Hence, the angle A formed between the plane of rim 13 and the adjacent surface of the cavity is obtuse. It is this sharp angle that gives rise to premature stressing of diaphragms 12 and 12', even if the diaphragms are thin and flexible. The present invention provides a cavity shape which avoids a sharp angle and the resultant diaphragm stresses.

The same problem of diaphragm stressing is found in those types of prior art D-P transducers in which a single diaphragm is supported within the midplane of a cylindrical insulating body, with semi-spherical cavities disposed on opposite sides of the diaphragm.

The D-P Transducer Structure

Referring now to FIG. 2, there is shown a D-P transducer according to the invention whose cylindrical body is constituted by an intermediate metal block 15 having planar faces sandwiched between a pair of outer blocks 16 and 16' of insulating material, such as ceramic. Block 16 has a cavity 17 formed in its planar outer face which communicates through a duct 18 lying on the longitudinal axis Z with a like cavity 17' formed in the planar outer face of block 16'.

The intermediate metal block 15 is capable of withstanding high mechanical stresses which non-metallic bodies cannot sustain, and it can be machined without difficulty to receive flanges or process connectors, as is required in installing the transducer.

A filling conduit 19 is transversely bored in intermediate metal block 15, this conduit lying on transverse axis Y and communicating with duct 18. Filling conduit 19 is provided with a ball-type seal 20 or similar means. A dielectric fluid F introduced through the filling conduit fills cavities 17 and 17'.

Cavity 17 is covered by a diaphragm 21 having a relatively thick peripheral margin 21A which is sealed to the annular rim 16A surrounding cavity 17. Similarly, cavity 17' is covered by a like diaphragm 21'.

These diaphragms are of thin insulating material, preferably glass, ceramic or some other amorphous, crystalline material. Alternatively, the diaphragm can be in simple disc form without a thickened peripheral margin.

The central region of cavity 17, as shown separately in FIG. 4, is metallized to provide a disc-shaped stationary electrode 22 whose center is aligned with the axis of symmetry Z. Electrode 22 is provided with a radial metallized band 23 providing a lead for connecting this electrode of the variable capacitor to an external circuit. Metallization is preferably effected by vacuum metallization techniques.

As shown separately in FIG. 5, the entire inner surface of diaphragm 21, whose center is aligned with the axis of symmetry Z, is metallized to form a movable electrode 24 which cooperates with stationary electrode 22 on the cavity surface to form a variable capacitor. Electrode 24 is provided with a non-metallized zone 25 to accommodate band 23 on the cavity surface when diaphragm 21 overlies cavity 17, the non-conductive zone preventing a short circuit of the capacitor electrodes.

It is important that the entire surface of the diaphragm be metallized, save for the non-metallized zone 25, for the metallized diaphragm then acts as an electrostatic shield to avoid parasitic electric field effects. A connection to electrode 24 on the diaphragm is made at the periphery thereof to an external circuit. This shield connection can, for example, be made to a ground point, so that the capacity of the capacitor varies in response to pressure relative to ground.

In a like manner, cavity 17' is provided with a metallized stationary electrode 22' and diaphragm 21' with a metalallized movable electrode 24' to form a variable capacitor responsive to pressure applied to this cell.

In a D-P transducer of the type in which the insulating body is provided at its central plane with a single diaphragm on either side of which is a concave cavity, in that type of transducer, both sides of the diaphragm are metallized to provide movable electrodes which cooperate with stationary electrodes metallized on the surface of the cavities.

As shown in FIG. 2, the body of the D-P transducer and the diaphragms sealed to opposite faces thereof are housed within a cylindrical casing 26 whose inner surface is sealed to the outer surface of the body and diaphragms. Blocks 15, 16 and 16', which together form the body of the transducer are sealed to each other, and the diaphragms are marginally sealed to the rims of the cavities, thereby forming a hermetically sealed transducer whose internal structure is impervious to the fluids applied to the transducer.

The Cavity Geometry

Referring now to FIG. 3, this figure shows the insulating block 16 included in the body of the D-P transducer, the body having a cavity 17 therein. It will be seen that the axis of symmetry Z passes through duct 18 into the center of the cavity.

Cavity 17 is surrounded by the annular rim 16A on the planar face of block 16. The contour of the cavity is defined by the curved surface of the cavity which extends from its center to the inner edge of rim 16 which is indicated by dashed line L. The curved surface of the cavity is constituted by an inner concave portion 17 in which merges with an outer portion 17 out in an inflection zone 17I. The outer portion 17out merges tangentially with the annular rim 16A on the front face of the body. In this way, no sharp angle is created at the rim, thereby avoiding stressing of the diaphragm.

Extending through the plane of the front face of body 16 is an axis r which is perpendicular to the axis of symmetry Z and intersects this axis at point 0. Hence, the position of a point P on the surface of concave cavity 17 is determined by the coordinates $r_1$ & $Z_1$. These coordinates determine the position of every point P on the concave surface of the cavity.

In FIG. 3, the dashed line L which is parallel to the axis of symmetry Z defines the inner edge of rim 16A surrounding cavity 17. The distance between axis Z and line L is represented by R, the radius of the concave cavity.

It has been found that if every point P whose position is determined by abscissa $r_1$ and ordinate Z, satisfies the equation $Z_1 = k(R^2 - r^2)^2$ where k is a constant, then the shape of the concave surface of cavity 17 is such that a variation in capacitance as a result of a diaphragm deflection responsive to an applied pressure will be similar to the variation in capacitance experienced in a cell using planar electrodes.

It must be understood that this is not the only preferred shape of the surface of the concave cavity, but the shape of a family of curves, each member of which is characterized by a particular value of k.

The depth of the cavity is represented by the distance between point O at the intersection of axes r and Z and point Q at the center of the cavity surface. Thus, we have, according to the equation, values of R which equal 15 mm cavities which range in depth between 30 and 100 μm. Cells having a small cavity depth are provided with the thickest diaphragms (i.e., 0.7 to 0.8 mm), while those with the deepest cavities will use the thinnest diaphragm (i.e., 0.1 mm). The cells having a small cavity depth will withstand a static pressure reaching 400 bar, while those having a greater depth will withstand a static pressure of 100 bar.

While there has been shown and described a preferred embodiment of a differential-pressure transducer in accordance with the invention, it will be appreciated that many changes and modifications may be made therein without, however, departing from the essential spirit thereof.

We claim:

1. A differential pressure transducer of the capacitive type responsive to fluid pressure comprising:

A a cylindrical body having insulating sections at either end, each section having a concave cavity therein surrounded by a planar annular rim, the cavities communicating with each other through an internal duct in said body and being filled with a dielectric fluid, said cavities being symmetrically disposed with respect to the longitudinal axis of the body which passes through the centers of the cavities, the contour of each cavity being defined by an inner concave portion whose center is aligned with said axis and whose periphery merges with an inflection zone, and an outer portion which curves from the inflection zone toward the rim to merge tangentially therewith to avoid a sharp angle at the inner edge of the rim, said zone being about half the distance from the center to the inner edge;

B a diaphragm covering each cavity and sealed to the rim; and

C a movable electrode formed on the diaphragm and cooperating with a stationary electrode formed on the surface of the cavity covered by the diaphragm to define a capacitor whose value varies as a function of fluid pressure applied to the diaphragm.

2. A transducer as set forth in claim 1, wherein the contour of the cavity which has a radius R is so shaped that every point P thereon whose position is determined by an abscissa rl extending between the longitudinal axis Z of the body and the point P, and an ordinate $Z_1$ which extends between the plane of the rim and Point P substantially satisfies the equation $Z_1 = k(R^2 - r^2)^2$, where k is a constant.

3. A transducer as set forth in claim 1, wherein said diaphragm is of insulating material and said movable electrode is metallized thereon.

4. A transducer as set forth in claim 3, wherein said diaphragm is formed of glass.

5. A transducer as set forth in claim 1, wherein said body is formed by an intermediate metal block sandwiched between blocks forming said insulating end sections.

6. A transducer as set forth in claim 5, wherein a fluid filling conduit is radially drilled in said intermediate body to communicate with said duct.

7. A transducer as set forth in claim 1, wherein said stationary electrode is formed by a disc-shaped metallic coating on the surface of the cavity which is centered on said axis and has a diameter substantially equal to half the diameter of the cavity, and a metallic band coated on the surface extending radially from the stationary electrode to the periphery of the cavity.

8. A transducer as set forth in claim 7, wherein said movable electrode is constituted by a metallic coating on the entire undersurface of the diaphragm except for an unmetallized zone which registers with the band on the stationary electrode to obviate a short circuit of these electrodes.

9. A transducer as set forth in claim 7, wherein said metallized coating is vacuum coated on the surface.

10. A transducer as set forth in claim 1, wherein said body and the diaphragms covering the cavities are housed in a cylindrical casing sealed thereto.

* * * * *